INVENTOR
JOHN EDWARD KAUFFMAN
BY Seidel & Gonda
ATTORNEYS.

METHOD OF PACKAGING INTEGRATED CIRCUITS

Filed July 17, 1967

INVENTOR
JOHN EDWARD KAUFFMAN

BY Seidel & Gonda

ATTORNEYS.

INVENTOR
JOHN EDWARD KAUFFMAN
BY
Seidel & Gonda
ATTORNEYS.

United States Patent Office 3,436,810
Patented Apr. 8, 1969

3,436,810
METHOD OF PACKAGING INTEGRATED CIRCUITS

John Edward Kauffman, Beth Ayres, Pa., assignor to The Jade Corporation, Beth Ayres, Pa., a corporation of Pennsylvania Filed July 17, 1967, Ser. No. 653,890
Int. Cl. H01l 1/14, 7/00; B23p 25/00
U.S. Cl. 29—577 7 Claims

ABSTRACT OF THE DISCLOSURE

Method of processing lead frame for packaging integrated circuit is accomplished by stamping the frame which can be welded directly to the circuit.

It is generally recognized that the packaging of an integrated circuit is an area wherein there has not been realized any substantial cost reductions. In normal practice, as many as twenty-eight welds are provided to join the integrated circuit to the terminal ends of leads. Such practice is time-consuming and costly. It has been proposed to etch the metal leads on a substrate such as ceramic so that the circuit may be simultaneously welded to all of the leads. While this latter method has some advantages and increased reliability, it creates some production problems and does not appear to materially reduce costs.

In accordance with the present invention, a lead frame is stamped in a manner so that the circuit can be welded directly to the terminal ends of the leads. In order to be able to reliably stamp a lead frame from material having a thickness of ten mils with leads five mils wide and spaced apart by a gap of five mils, I have found that two features are significant. First, the thickness of the terminal ends of the leads must be three to four mils, and the surface of the terminal ends must be a metal compatible with the circuit. The method of the present invention incorporates these features.

It is an object of the present invention to provide a novel method for packaging an integrated circuit.

It is another object of the present invention to provide a method for making a lead frame to form a part of an integrated circuit package.

It is another object of the present invention to provide a method for making lead frames which is simple, adapted for high speed production, and reliably produces frames inexpensively.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
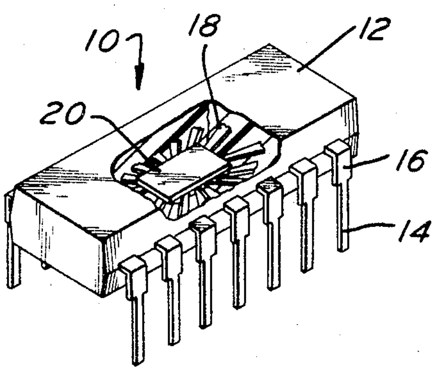
FIGURE 1 is a perspective view of an integrated circuit package which is partially broken away for purposes of illustration.
Figure 12:
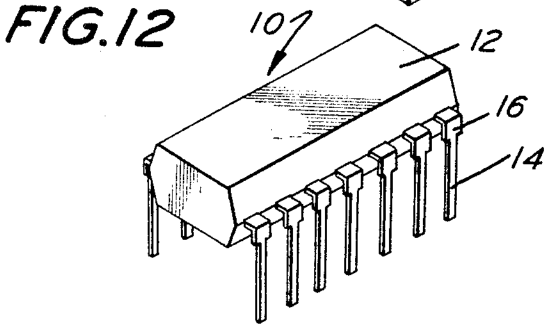
FIGURE 12 is a perspective view of the semi-conductor integrated circuit.

Referring to the drawing in detail, wherein like numerals indicate like elements, there is shown in FIGURES 1 and 12, a packaged semi-conductor such as an integrated circuit designated generally as 10 and having exposed leads 14 extending into a carrier 12. The leads are provided with enlarged shoulder portions 16 having terminal ends 18 welded to an integrated circuit wafer or chip 20. The terminal ends 18 and the wafer 20 are encased within a carrier 12 which may be any one of a wide variety of thermosetting plastic materials or ceramic materials.

Figure 2:
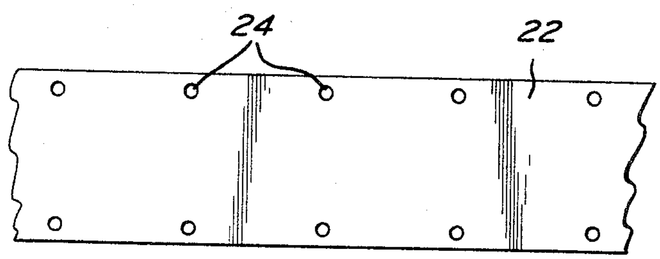
FIGURE 2 is a plan view of a portion of a strip of metal.
Figure 3:
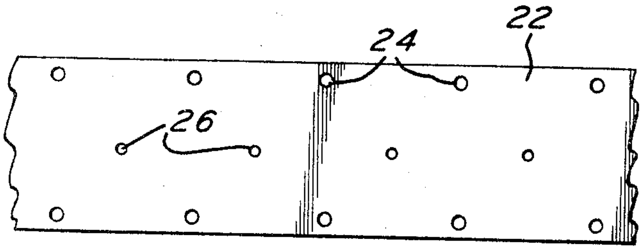
FIGURE 3 is a partial plan view of the strip of metal shown in FIGURE 2 after subsequent processing.
Figure 4:
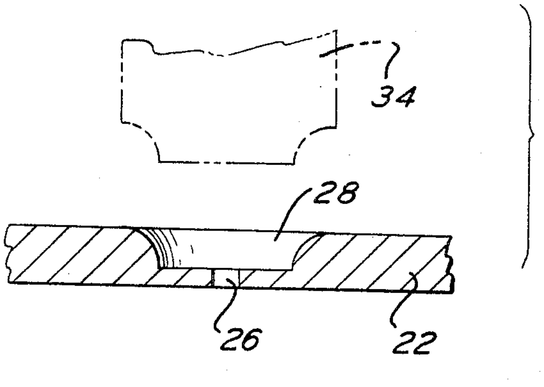
FIGURE 4 is a vertical sectional view of the strip in FIGURE 3 after subsequent processing.

In FIGURE 2, there is illustrated an endless strip of metal 22. Strip 22 may be a strip of Kovar or mild steel having a thickness of .01 inch and a width of 1¼ inches. The first step in processing strip 22 is to apply orientation information thereon at spaced points therealong. Preferably, this is accomplished by punching pilot holes 24 adjacent the side edges at spaced points therealong with a distance of about 1 inch between adjacent holes. As shown more clearly in FIGURE 3, the next step is to apply relief holes 26 at spaced points along the strip 22. It will be noted that the relief holes 26 are along a centerline of the strip 22 and are centrally located with respect to the holes 24. Holes 26 are preferably punched. It will be obvious to those skiled in the art that holes 24 and 26 may be applied in other manners, such as by drilling.

The next step in processing strip 22 is to spot-face the strip 22 at spaced points therealong coinciding with the location of the relief holes 26. The spot-facing produces a cavity 28 and is preferably accomplished by an end face milling tool 34. Tool 34 is preferably a carbide cutting tool. No lubrication is utilized so that a good mechanical bond may be formed with the cavity walls as will be described hereinafter. The depth of the cavity 28 is preferably .006 to .007 inch, thereby leaving a thickness of .004 to .003 for the height of the material surrounding the hole 26.

Figures 5, 6, 7:
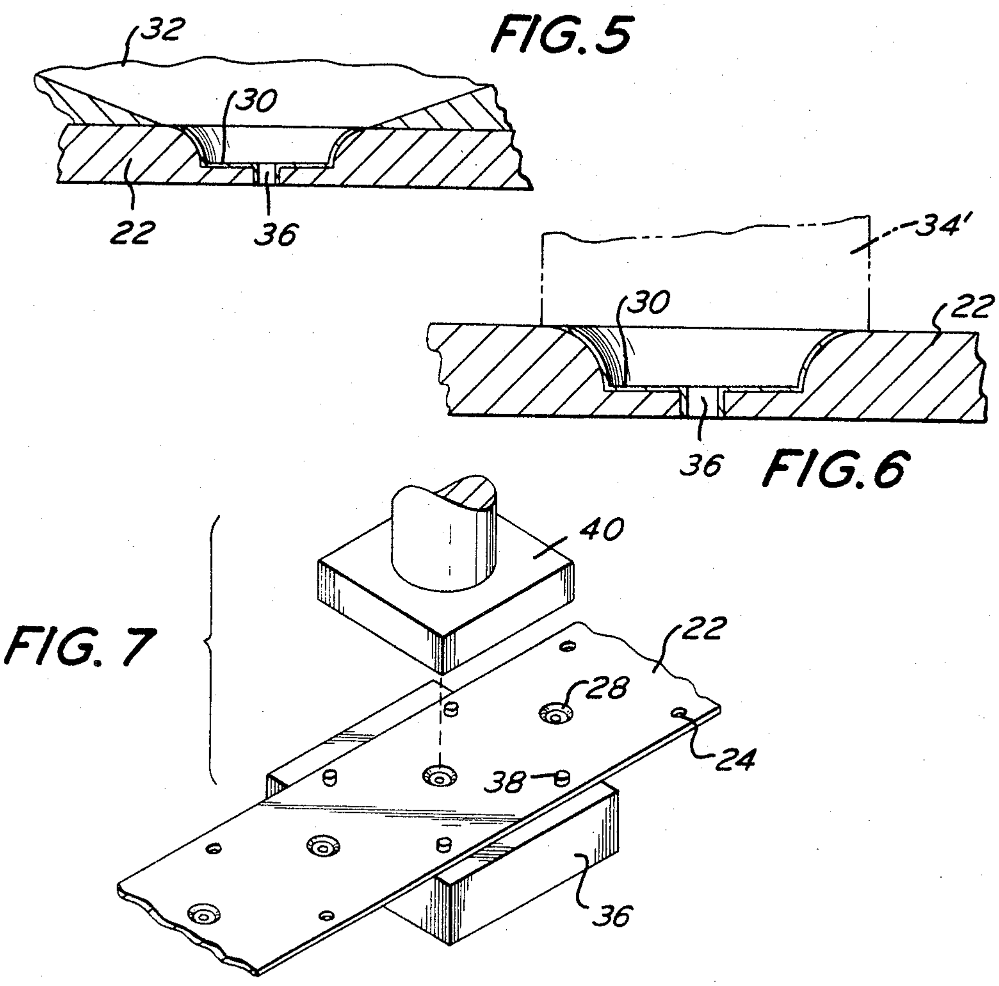
FIGURE 5 is a vertical sectional view of the strip in FIGURE 4 after subsequent processing.
FIGURE 6 is a vertical sectional view of the strip in FIGURE 5 after subsequent processing.
FIGURE 7 is a partial perspective view of the stamping step.

As shown more clearly in FIGURE 5, the walls of the cavity 28 are coated with a metal coating 30. Coating 30 may be applied by a plasma gun so that the coating is mechanically bonded to the walls of cavity 28. A shield 32 is provide so that the coating 30 is applied only to the walls of the cavity 28 and does not coat the upper surface of the strip 22. Coating 30 may have a thickness of .002 inch and preferably is a metal compatible with the boundaries of the integrated circuit on wafer 20. For example, when using a silicone wafer, it would be undesirable to bond the wafer directly to copper or silver since these metals will form salts which poison the wafer. Also, the metal of coating 30 must be oxide resistant and malleable so that it may be ultrasonically bonded to the wafer 20. A suitable material for coating 30 may be gold or aluminum.

The coating step for applying coating 30 may be accomplished by a variety of processes. For example, it would be possible to vacuum deposit the coating 30, ultrasonically weld a layer of metal to strip 22 in the cavity 28 to form the coating 30, etc. The next step, as shown more clearly in FIGURE 6, is to reface the coating 30 by a tool 34' to level out the high and low spots and remove any oxides. Tool 34' is substantially identical with tool 34 except for dimensions. Thus, a tool 34' reduces the final thickness of the coating 32 to about .0004–.0006 inch.

The next step in processing strip 22 is to pass the same between the platen 36 and stamping head 40 of a stamping machine. The platen 36 may have pins 38 or other devices which cooperate with the holes 24 in order to orientate the strip 22 with respect to the stamping head 40.

Figure 8:
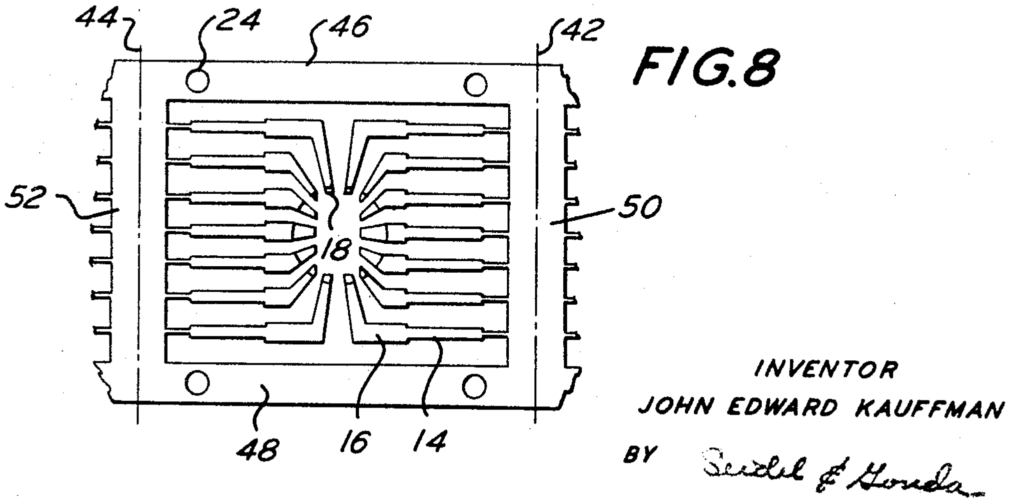
FIGURE 8 is a partial plan view of the strip of metal after the stamping step.
Figure 9:
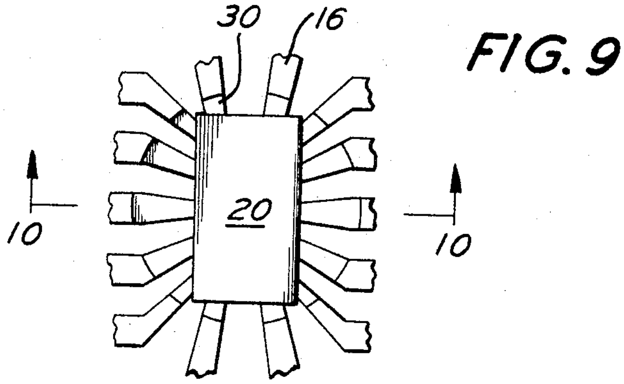
FIGURE 9 is a partial top plan view on an enlarged scale showing an integrated circuit wafer welded to the terminal ends of the leads.
Figures 10, 11:
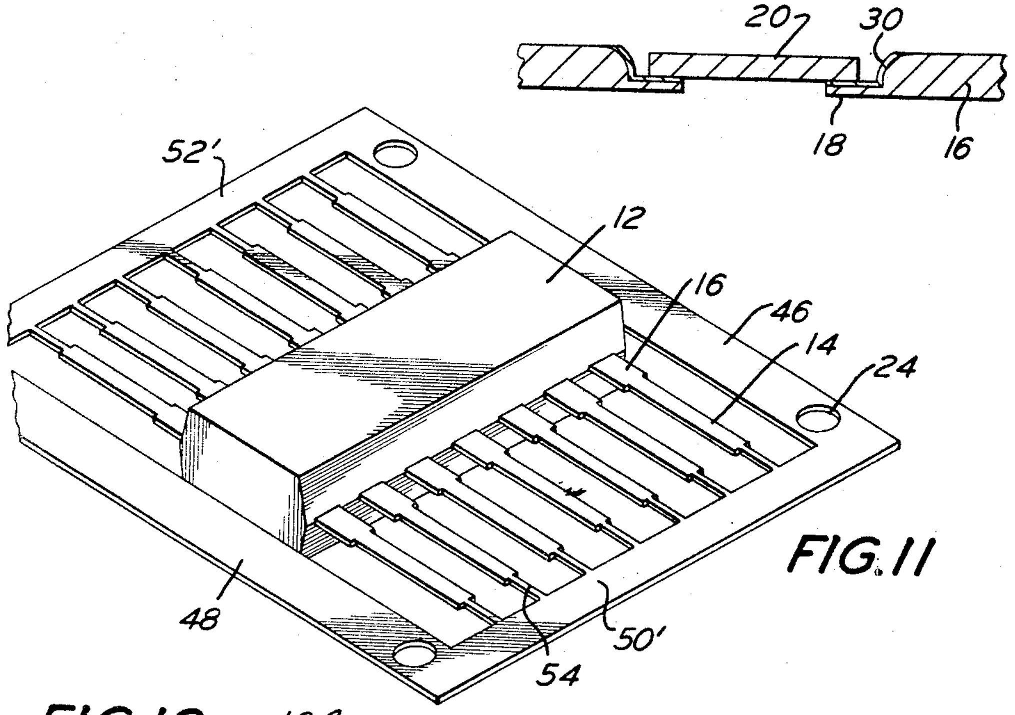
FIGURE 10 is a sectional view taken along the line 10—10 in FIGURE 9.
FIGURE 11 is a perspective view of a lead frame wherein the wafer of FIGURE 10 and the terminal ends of the leads have been encased within a carrier.

As shown more clearly in FIGURE 8, after the stamping step, the strip 42 includes side portions 46 and 48 interconnected at spaced points therealong by webs 50 and 62. The leads 14 extend toward each other from the webs 50 and 52. The next step is to cut the webs 50 and 52 along the lines 42 and 44, thereby separating the elongated strip into a plurality of lead frames. The webs 50′ and 52′ on the lead frames, as shown more clearly in FIGURE 11, have a width which is one-half the width of the webs 50 and 52. The next step is to ultrasonically weld the wafer 20 to the coating 30 on the terminal end 16′. Thereafter, the terminal ends 16′ and the wafer 20 are encapsulated by the carrier 12 which is preferably a thermosetting plastic which per se is well known to those skilled in the art. Encapsulation could take place before the cutting step.

The next step in processing is to remove the side portions 46, 48, webs 50′ and 52′ of the frame as well as the trim 54. This is preferably accomplished by a stamping operation which simultaneously bends the leads in the shoulder portion 16 so that the leads are parallel to one another as shown more clearly in FIGURES 1 and 12.

It is an important feature of the present invention to reduce the thickness of the central portion of the strip 22 at spaced points therealong as shown by cavities 28. This reduction in thickness is necessary if the leads are to be stamped reliably and have the dual characteristic of 10 mil thickness and 3 mil thickness integrally on the same frame member without introducing welding or some similar metal joining technique. Further, the 10 mil thickness is provided in order to satisfy normal lead positioning and characteristics, while the 3 mil thickness is required in order to stamp or form leads 5 mils wide with 5 mil spacing between.

While the above disclosure refers to an integrated circuit wafer or chip, it will be obvious to those skilled in the art that the integrated circuit 20 may be any one of a wide variety of semi-conductors and/or electrical devices hereinafter referred to as semi-conductor devices.

It will be noted that the wafer 20 is ultrasonically welded directly to the coating 30 on the terminal ends 18. Thus, the wafer 20 is joined to leads with a single weld which substantially improves reliability while substantially reducing time and cost of manufacture. The ability to provide the lead frame from a stamping also substantially reduces time and cost of manufacture.

The present invention may be embodied in other specific forms without departing from the spirit or essential attributes thereof and, accordingly, reference should be made to the appended claims, rather than to the foregoing specification as indicating the scope of the invention.

I claim:

1. In a method of packaging a semi-conductor device comprising the steps of applying holes in a repetitive pattern in a strip of metal having a thickness of about .010 inch, reducing the thickness in a central portion of the strip at spaced points therealong to about .003–.004 inch, coating said portions with a metal compatible with a circuit component, and stamping said strip at spaced points along said strip to define integral cantilever leads having said coated reduced thickness portions at their terminal ends, and then separating said strip into unit lengths each containing at least one stamped portion.

2. In a method in accordance with claim 1 wherein said strip of metal is selected from the group consisting of Kovar and mild steel, and said coating being a metal selected from the group consisting of gold and aluminum.

3. In a method in accordance with claim 1 wherein said step of reducing the thickness includes milling cavities in said strip at spaced points therealong.

4. In a method in accordance with claim 1 including the step of superimposing a semi-conductor device over the terminal ends of the leads, ultrasonically welding the semi-conductor device to said coating, and then encapsulating the terminal ends of the leads and the semi-conductor device.

5. In a method of packaging a semi-conductor device comprising the steps of providing an elongated metal strip, reducing the thickness in a central portion of the metal strip at spaced points therealong, coating said portions with a metal compatible with a semi-conductor device, stamping said strip at spaced points therealong to define integral cantilever leads having said coated reduced thickness portions at their terminal ends, and then separating said strip into unit lengths, each containing at least one of said stamped portions.

6. A method in accordance with claim 5 including the steps of superimposing an integrated circuit over said coated terminal ends, and simultaneously ultrasonically welding the circuit to the coating on said terminal ends.

7. A method in accordance with claim 6 wherein said metal strip being Kovar, and said coating step including bonding thereto aluminum having a thickness substantially less than the thickness of said metal strip.

References Cited

UNITED STATES PATENTS

| | | | |
|---|---|---|---|
| 2,962,639 | 11/1960 | Pensak | 29—591 X |
| 3,118,016 | 1/1964 | Stephenson | 174—68.5 |
| 3,255,511 | 6/1966 | Weissenstern et al. | 29—589 |
| 3,271,625 | 9/1966 | Caracciolo | 317—101 |
| 3,281,628 | 10/1966 | Bauer et al. | 29—588 X |
| 3,305,914 | 2/1967 | Raue. | |
| 3,317,287 | 5/1967 | Caracciolo. | |

WILLIAM I. BROOKS, *Primary Examiner.*

U.S. Cl. X.R.

29—417, 588, 591, 527; 174—52.5